June 30, 1964 R. VOLES 3,139,522

DIGITAL DIFFERENTIAL ANALYZERS

Filed May 16, 1960 2 Sheets-Sheet 1

Inventor
R. Voles
By Glascock Downing & Seebold
Attys.

June 30, 1964 R. VOLES 3,139,522

DIGITAL DIFFERENTIAL ANALYZERS

Filed May 16, 1960 2 Sheets-Sheet 2

Inventor
R. Voles
By Glascock Downing & Seebold
Attys.

United States Patent Office 3,139,522

Patented June 30, 1964

3,139,522
DIGITAL DIFFERENTIAL ANALYZERS

Roger Voles, Chiswick, London, England, assignor to Electric & Musical Industries Limited, Hayes, Middlesex, England, a company of Great Britain Filed May 16, 1960, Ser. No. 29,449
Claims priority, application Great Britain May 19, 1959
4 Claims. (Cl. 235—152)

Figure 1:
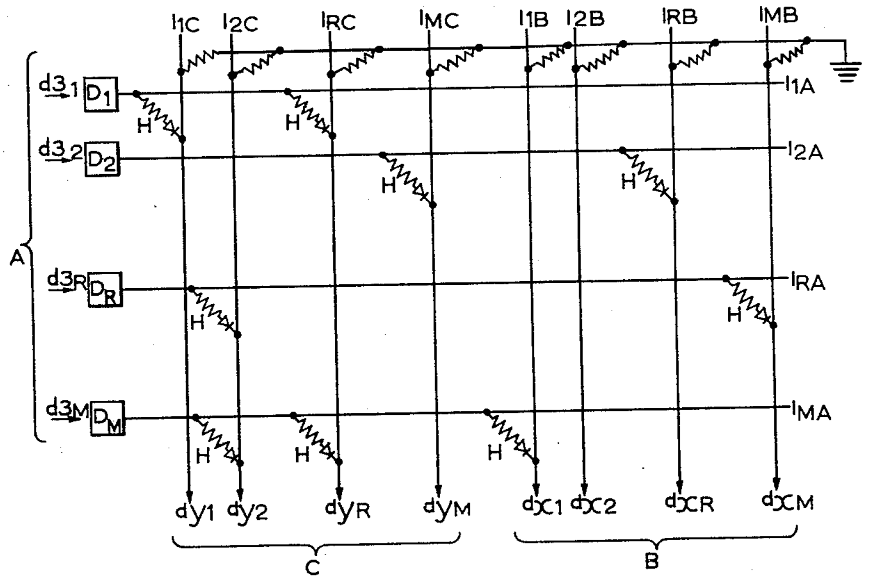

This invention relates to digital differential analyzers.

In solving differential equations automatically a number of consecutive steps of integration are effected. Thus the basic component of a differential analyzer is an integrator. The integrator has two inputs, one for $dx$, increments in the investigation variable and one for the integrand $y$ and its increments $dy$, and one output for $dz$, the increments in the integral where the relationship between $x$, $y$ and $z$ is $dz=Kydx$, K being a constant dependent upon the physical properties of the integrator. In the well known mechanical wheel and disc integrator the $dx$ input is translated into rotation of the wheel, the $dy$ input into radial movement of the wheel relatively to the disc and the $dz$ output is represented by the consequent rotation of the disc. The corresponding integrator of a digital differential analyzer comprises two accumulators and gating means for transferring additively the contents of the first accumulator to the second accumulator without removing said contents from said first accumulator. The first accumulator has as its input increments $dy$ which are summed to give the instantaneous value of $y$. The $dx$ inputs are applied to the gating means and are therefore instructions to transfer the instantaneous value of $y$ to the second accumulator. The second accumulator contains a residue number R to which the number $y$ is added. The second accumulator has a certain specified capacity and when this capacity is reached said accumulator overflows, generating a $dz$ pulse, the amount by which the particular $R+y$ value exceeds the capacity of the second accumulator remaining in said accumulator as the new R number. It will be appreciated that $dz$ is represented by the output rate from the second accumulator which rate is dependent upon $y$ and the rate of $dx$. If a digital system is employed, every time the capacity of the second accumulator is exceeded a "1" is generated as output whereas if on the transfer of a $y$ number the capacity is not reached a "0" is generated. Thus the $dz$ output is in the form of "1's" and "0's" the value of $dz$ being determined by the rate of the "1's."

Two types of digital differential analyzers have been proposed. The first type is known as a space distributed analyzer and employs a plurality of interconnected integrators such as the one described above, the $dz$ outputs of various integrators being fed to form either $dx$ or $dy$ inputs of succeeding ones. The second type is known as a time multiplex analyzer in which an economy of components and space is attained by using one integrator alone to service all integrations. In order to employ only one integrator it will be appreciated that some form of store, usually a magnetic drum, is required for temporarily storing the values of $y$, $dz$ and R until they are required to be applied to the integrator. Either type of analyzer can be operated in serial or parallel mode and using a binary, ternary or other notation for the $dz$'s. For example, one cycle of the analyzer may comprise about 100 elementary integrations from which there arise respective $dz$ elements, having values "1" or "0." The $dz$ store must therefore have a capacity for a large number of $dz$ elements, although the maximum number of such $dz$ elements which may be required to contribute to any one elementary integration is small, usually less than 5. Depending on the nature of the problem to be solved, the $dz$ elements required for one elementary integration may arise from one or more of the other elementary integrations in a cycle and as a result may be in any position in the $dz$ element store. It is usual, therefore, to scan a $dz$ element store preparatory to each elementary integration in order to select the required $dz$ elements and the scanning process imposes a severe limitation on the speed of operation of the analyzer since it very often takes a much longer time than that required to process an integrator.

The object of the invention is to provide a digital differential analyzer of the time multiplex type having an improved $dz$ element store whereby the disadvantage referred to above can be substantially removed.

According to the present invention there is provided a digital differential analyzer comprising digital integrating means, a first plurality of input signal paths for increments to the respective integrands of the different integrations of an integration cycle, a second plurality of input signal paths for increments in the respective integration variables of the integrations of the cycle, means for coupling said input signal paths to said integrating means, a plurality of output signal paths corresponding respectively to the different integrations, means for deriving output signals from said integrating means representing increments in the integrals produced as a result of an integration, means for applying said output signals to the respective output signal paths, and programming means for selectively connecting said output signal paths to apply signals to said input signal paths, said programming means comprising means for producing analogue signals of one of a plurality of predetermined values in response to said output signals, means for summing said analogue signals in different combinations according to a desired programme to produce a plurality of output analogue signals simultaneously, and means for maintaining said output analogue signals on said first plurality of input signal paths, said coupling means comprising analogue to digital converting means for converting an output analogue signal into digital form for application to said integrating means.

In a preferred form of the invention, each output signal path (which may be termed a $dz$ channel) comprises a storage device for storing any output signal produced by the integrating means in response to the elementary integration to which the path corresponds, these output signals representing increments of the integral. In the case of the $dx$ path, it is only necessary to connect one storage device to each path, but in the case of the $dy$ paths, a plurality of storage devices (five or more) may have to be connected to any one of said first plurality of input paths as the programme requires. The $dy$ paths may then include a common analogue summing device having the $dy$ paths connected to its input terminal by way of normally closed gates, the gates being opened in sequence to apply pluralities of coincident signals to the summing device to produce analogue signals of which the amplitudes represent the increments $dy$ required for the successive elementary integrations. As normally the increments are required in digital form, the summing device should be followed by an analogue-to-digital converter which responds to the amplitudes of the analogue signals to produce groups of digital signals representing these amplitudes.

By virtue of the invention, the derivation and transfer of the input increments $dx$ and $dy$ can take place very rapidly so that no appreciable restriction is imposed on the speed of operation. The invention imparts to a time multiplex analyzer some of the advantages of a space distributed analyzer.

Figure 2:
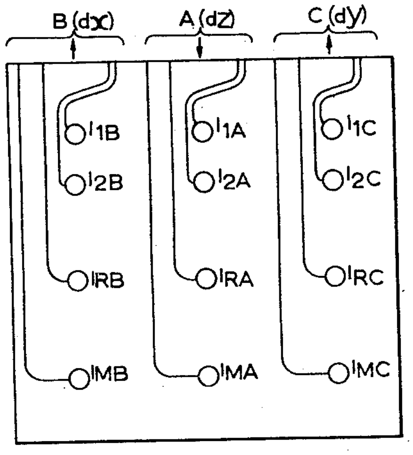
Figure 3:
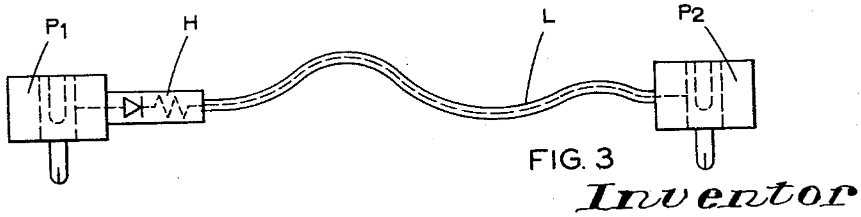
Figure 4:
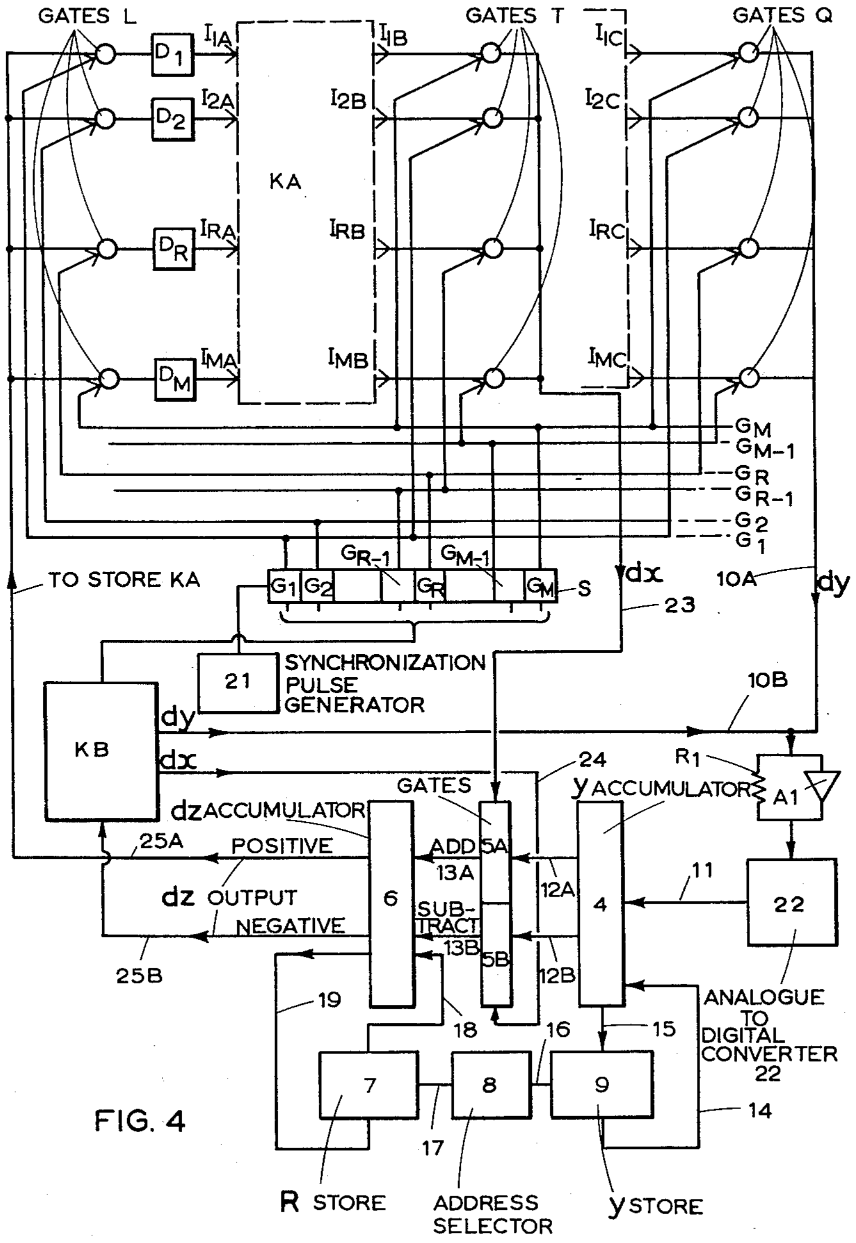

In order that the invention may be clearly understood and readily carried into effect it will now be more fully described with reference to the accompanying drawings, in which:

FIGURE 1 represents diagrammatically a portion of a programming circuit for use in a digital differential analyzer in accordance with an embodiment of the invention, FIGURE 2 shows a plugboard which may form part of the circuit of FIGURE 1, FIGURE 3 shows a connector for the plugboard of FIGURE 2, and FIGURE 4 shows diagrammatically other parts of a digital differential analyzer adapted to employ the programming circuits of FIGURE 1.

Referring to FIGURE 1 the circuit shown is intended for an anlyzer using a ternary system for $dz$ with values 1, 0, and $-1$. The programming system comprises two sets of conductors or lines forming a matrix of cross-over points. The matrix has two planes, one for $dz$ signals representing $+1$ and the other for $dz$ signals representing $-1$. However as the two planes are substantially the same, the detailed description will be confined to that for signals representing $+1$. As shown the horizontal lines of the "positive" plane are labelled $I_{1A}$, $I_{2A}$ . . . $I_{RA}$ . . . $I_{MA}$ where M is the total number of elementary integrations possible in a cycle of integration by the device described, whilst the vertical lines are in two groups, namely $I_{1B}$, $I_{2B}$ . . . $I_{RB}$ . . . $I_{MB}$ and $I_{1C}$, $I_{2C}$ . . . $I_{RC}$ . . . $I_{MC}$. The expressions "horizontal" and "vertical" are used merely for identification purposes and the lines need not be horizontal and vertical in practice. The positive $dx$ and $dy$ inputs for the integrator of the analyzer are derived from the $I_B$ and $I_C$ lines respectively. Thus for the Rth elementary integradation the $dy_R$ input is derived from the $I_{RC}$ line and the $dx_R$ input is derived from the $I_{RB}$ line. At the end of the (R$-$1)th elementary integration the $dz_{R-1}$ output bit is required to be distributed to an appropriate holding point for use as $dx$ and/or $dy$ inputs in future elementary integrations. For this purpose M bistable circuits $D_1$, $D_2$ . . . $D_R$ . . . $D_M$, which may, for example be flip flops, are provided, each coupled with an $I_A$ line, and the positive $dz_{R-1}$ output bit is applied to $D_{R-1}$ so as to set it to one of its two conditions so that the $dz_{R-1}$ output is held or stored. A similar set of M bistable circuits are provided for the negative $dz$'s. When a $dz$ output bit representing 1 is stored in any of the bistable circuits D, a positive potential is maintained on the corresponding $I_A$ line until the state of the bistable circuit D is changed as a result of a subsequent integration. In order to distribute the $dz$ bits held in the bistable circuits $D_1$ to $D_M$ to the appropriate $I_B$ and $I_C$ lines to form $dy$ and/or $dx$ inputs in succeeding periods of integration the aforesaid rows and columns of the matrix M are selectively interconnected by connectors each comprising the series combination of a resistor and diode, some of which combinations are denoted by reference H. The biasses applied to the lines of the matrix are such that current can flow between a horizontal line and a vertical line by way of a connector H only when the respective two state device D has been switched to the state corresponding to a $dz$ output bit representing 1. The output voltage of a bistable device D is arranged to be positive when the device is in the "1" state and negative when it is in the "0" state. The vertical lines $I_{1B}$, $I_{2B}$, . . . $I_{MB}$ and $I_{1C}$, $I_{2C}$, . . . $I_{MC}$ of the matrix are connected to ground through individual resistors, so that if all of the bistable devices D connected via series combinations H to any vertical line are in the "0" state then that line is maintained at ground potential. On the other hand, if one or more devices D in the "1" state are connected by combinations H to a vertical line, then current flows through the combinations H to the line, which current raises the voltage on the line. However, as explained hereinafter with reference to FIGURE 4, in the case of the selected one of the lines $I_{1C}$, $I_{2C}$, . . . $I_{MC}$ connected via the open one of the gates Q to the input of the amplifier A1, because the feedback resistor R1 tends to maintain the input of the amplifier A1 at ground potential, the voltage on the selective line does not change appreciably from ground potential, but the output voltage of the amplifier A1 is proportional to the current flowing into the selected line from the devices D. Because the devices D are similar to one another and the resistances of the combinations H are all equal, the output voltage of the amplifier A1 is also proportional to the number of devices D in the "1" state connected by combinations H to the selected line. Hence in the case of a positive $dz_2$ bit, for example, this can be distributed to the $I_{MC}$ line and to the $I_{RB}$ line, so that when the $dy_M$ information is read out from the $I_{MC}$ line this includes $dz_2$, and when the $dx_R$ information is read out from the $I_{RB}$ line this is constituted by $dz_2$.

The resistor-diode connectors between the I lines can be in the form of permanent connections, but preferably in order to enable the analyzer to operate with different programmes each of the I lines can be connected to a socket of a plugboard such as the one shown in FIGURE 2, and the connectors may then be detachable to allow for alteration of the programme. It will be appreciated that the plugboard will be provided with 3M sockets which can conveniently be arranged in rows as shown, the A or $dz$ row preferably being the central row since sockets in the A row will usually have to be connected both to sockets in the B($dx$) row and to sockets in the C($dy$) row whereas B and C sockets will not have to be connected together. The permanent connections to the sockets can conveniently be formed on the plugboard by printed circuit techniques. In order to effect the required interconnections between the sockets, as determined by the programme there are provided a plurality of "plug-in" connectors such as the one shown in FIGURE 3. Thus each connector includes two plugs $P_1$ and $P_2$ connected together by a flexible lead L. One plug, in this case $P_1$ is connected to the lead L via the respective diode and resistor combination H mounted in a housing integral with or connected to the plug $P_1$, said diode and resistor being shown diagrammatically in dotted form. The conducting prong of each plug which can be inserted into a socket of the plugboard is integral with or connected to a further socket whereby a second plug can be plugged into the socket of a first plug which is itself plugged into a socket of the plugboard. Hence any desired number of plugs can be connected to one socket, although usually the arrangement will be such that not more than about five plugs would be required to be connected to any one socket. Thus referring again to FIGURE 1 in the case of the $I_{1A}$ socket, for example, two connectors will be connected thereto, one of these being also connected to the $I_{1C}$ socket and the other being also connected to the $I_{RC}$ socket. Plugs $P_1$ should be connected to A sockets and preferably means for identifying the $P_1$ ends of the connectors such as a distinctive colouring should be provided. The accuracy required for the resistance value is only about 5 percent if the number of $dy$ inputs in each elementary integration is not more than about 5. This accuracy of about 5 percent applies also to the output voltages fed from the bistable circuits D to the lines $I_{1A}$, $I_{2A}$ . . . $I_{3A}$.

Referring to FIGURE 4 which shows in diagrammatic form one example of a digital differential analyzer using programming devices such as that shown in FIGURE 1. One such programming device is represented by the block KA and has inputs $I_{1A}$, $I_{2A}$ . . . $I_{MA}$ and outputs $I_{1B}$, $I_{2B}$ . . . $I_{MB}$ and $I_{1C}$, $I_{2C}$ . . . $I_{MC}$ which correspond to the lines bearing the same references in FIGURE 1. Also, as in FIGURE 1, bistable circuits $D_1$, $D_2$ . . . $D_M$ are connected to drive the lines $I_{1A}$, $I_{2A}$ . . . $I_{MA}$ respectively. The outputs $I_{1C}$, $I_{2C}$ . . . $I_{MC}$ are connected via respective normally closed gates Q to the conductor 10A and therefore to the input of the amplifier A1. The amplifier A1 has a negative feedback resistor R1 so that the amplifier acts as an analogue adding circuit. The output of the amplifier A1 is applied to an analogue to digital converter 22 which produces a binary coded digital signal representing the voltage output of the amplifier A1 in parallel form along the path 11. It will be appreciated that the path 11 comprises a plurality of parallel conductors, one for each binary digit although only one line is shown in FIGURE 4. The conductors of the path 11 are connected to corresponding stages of the $y$ accumulator 4 which is a parallel binary accumulator. The accumulator 4 has three output paths 12A, 12B and 15 all of which comprise a plurality of parallel conductors so that the binary digital information can be transmitted in parallel along them. The paths 12A, 12B and 15 transmit the number stored in the accumulator to the gates 5A, 5B and the $y$ store 9 respectively. The $y$ store 9 is a magnetic core matrix store transfers to and from which are controlled by the address selector 8 although other types of store are equally suitable. The output signals of the store 9 are transferred in parallel along the path 14 to the accumulator 4 so that a $y$ value from the store 9 may be augmented or reduced by the output from the analogue to digital converter 22 in the accumulator 4. The reading and writing circuits for the store 9 and the control circuits for the address selector 8 are not shown in the drawing since these are of conventional form. The address selector 8 which selects the addresses cyclically in a predetermined order, also controls transfers to and from the residue or R store 7 so that corresponding $y$ values and R values may be transferred to and from the stores 9 and 7 simultaneously.

The gates 5A and 5B, each of which comprises a plurality of normally closed individual gates one for each binary order, have output paths 13A and 13B which are connected to the inputs of the $dz$ accumulator 6. Both paths 13A and 13B comprise a plurality of conductors one for each binary order and are connected to input connections of stages of the accumulator 6 of corresponding binary order the path 13A being connected to adding inputs of the accumulator 6 and the path 13B to subtracting inputs. The output of the store 7 is also connected to inputs of the accumulator 6 so that an R value from the store 7 can be augmented or reduced by the quantity in the accumulator 4 depending on whether the gates 5A or 5B are enabled. The accumulator 6 has three output paths 25A, 25B and 19. The accumulator 6 comprises a plurality of binary stages, the highest order one of which is designated as the sign stage. Signals representing a positive overflow, that is $dz=+1$, are transmitted along the path 25A to the gates L. The gates L are normally closed and their outputs are connected to the inputs of the bistable circuits $D_1, D_2 \ldots D_M$. Signals representing a negative overflow, or $dz=-1$, are transmitted along the path 25B. All of the stages of the accumulator 6 but the sign stage are connected by respective conductors of the path 19 to inputs of the store 7. The scale of the variables $y$ is chosen so that the $dz$ output will be $-1$, 0 or $+1$ for each elementary integration.

The outputs $I_{1B}, I_{2B} \ldots I_{MB}$ are connected via the normally closed gates T and the conductor 23 to the controlling input of the gates 5A.

As the programming circuit operates on the ternary scale, a second plane similar to that shown in FIGURE 1 is required for handling $dz$ elements having negative significance. This second plane is included in the block KB which block also includes a further set of bistable circuits such as $D_1, D_2 \ldots D_M$ and further sets of gates such as L, T and Q. The programming circuit in the block KB differs from the arrangement shown in FIGURE 1 in that the diodes included in the resistor diode combinations H are of reverse polarity, but the combinations H interconnect those horizontal and vertical lines of the programming circuit in KB which correspond to the horizontal and vertical lines in the programming circuit in the block KA which are interconnected by combinations H. The vertical lines of the programming circuit in the block KB are also grounded through individual resistors as in the circuit shown in FIGURE 1. Moreover, the bistable circuits D within the block KB when set to represent the condition $dz$ equal $-1$ are arranged to apply a predetermined negative voltage to the horizontal lines of the programming circuit in KB, and when in the "0" state to apply a positive voltage to those lines. This means that when a particular elementary integration is to be performed in $dz$ elements which are required to take part in that elementary integration have the value $+1$ contribute a positive output current of predetermined magnitude to the particular vertical lines of the plane KA allocated to that integration. Similarly, any $dz$ elements taking part in that elementary integration which have the value $-1$ contribute a negative output current of the same predetermined magnitude to the particular vertical lines of the programming circuit within the block KB allocated to that integration. The outputs from the block KB from vertical lines of the programming circuit contained therein corresponding to the vertical lines $I_{1C}, I_{2C} \ldots I_{MC}$ of block KA are connected via gates corresponding to the gates Q to the conductor 10B which is connected to the input of the amplifier A1. Outputs of the programming circuit for the block KB from lines corresponding to $I_{1B}, I_{2B} \ldots I_{MB}$ of KA are connected via gates corresponding to the gates T to the conductor 24 which is connected to the controlling input of the gates 5B. The path 25B from the accumulator 6 is connected via gates in the block KB corresponding to the gates L to the bistable circuits within the block KB.

A synchronisation pulse generator 21 is provided which applies a succession of pulses to a distributor S. The distributor S is a cyclically connected shift register which is arranged to produce an output signal from its stages in cyclic succession one stage at a time, the signal being stepped along by pulses from the generator 21. Each stage of the distributor S is connected to the controlling connections of a respective gate L, a respective gate T and a respective gate Q and corresponding gates in the block KB, to enable these gates to pass signals for the duration of the period for which that stage of the distributor S is producing an output signal.

The operation of the digital differential analyzer is controlled by a synchronising pulse generator 21 which provides all the synchronising pulses required in the analyzer. For example it applies pulses to the pulse distributor S having M stages, the pulse distributor being common to both programming circuits KA and KB. The distributor S initiates in turn the elementary integrations in each cycle of integration. Thus at the end of the first elementary integration of a cycle, the stage G1 of the distributor S is activated to enable gates L, T and Q for the lines $I_{1A}$, $I_{2B}$ and $I_{2C}$ to pass signals respectively, for the duration of the second elementary integration of the cycle. The enabling of a gate T and the corresponding gate in KB applies the $dx$ increment (if any) for the next elementary integration to the conductor 23 or 24 depending on whether the $dx$ increment is positive or negative the integration being arranged so that all $dx$ increments are 1, 0 or $+1$. The enabling of a gate Q and the corresponding gate in KB allows positive and negative currents to flow to conductors 10A and 10B respectively these currents being proportional to the members of positive and negative $dz$'s contributing to the $dy$ increment for the next integration. The enabling of a gate L and the corresponding gate in KB conditions the programming circuits to receive for storage in the corresponding bistable circuits D any $dz$ element (positive or negative) produced by the accumulator 6 during the particular elementary integrations just ended. In the general case after the (R–1)th elementary integration, i.e. on generation of the $G_{R-1}$ gating pulse the $dz_{(R-1)}$ pulse is applied to the $D_{(R-1)}$ bistable circuit whilst the $dy_R$ and $dx_R$ pulses are derived from the $I_{RC}$ and $I_{RB}$ lines respectively.

The positive and negative currents flowing in the conductors 10A and 10B from the bistable circuits D being set to the "1" state to represent $dz=+1$ or $-1$ via a gate Q and a corresponding gate in KB are applied to an amplifier A1 which has a negative feedback path comprising the resistor $R_I$ arranged to cause the amplifier A1 to operate as a summing amplifier. The output of the amplifier A1 is therefore a voltage which represents the algebraic sum of all the *dz* elements required to contribute to the elementary integration taking their signs into account since each *dz* element equal to +1 contributes a positive current of predetermined magnitude through one of the resistor-diode combinations H in KA to the conductor 10A via a gate Q, and each *dz* element equal to −1 contributes a negative current of the same predetermined magnitude through a resistor diode combination in KB to the conductor 10B via a gate in KB corresponding to the gate Q in KA which is open. This output voltage represents *dy* for the particular integration and it is applied to an analogue-to-digital converter 22, which may be of any known construction for example that described in British patent specification No. 679,725. Apart from the programming circuit, the digital differential analyzer operates in binary code, and the well known complements code is used to represent negative numbers. The analogue-to-digital converter 22 is therefore of such a construction that it can convert either positive or negative analogue voltages into their appropriate binary representations. The output of the analogue-to-digital converter, which is in parallel mode, is applied by way of a path 11 to the *y*-accumulator 4 of the analyzer.

For each elementary integration the *y* accumulator 4 also has applied to it the up-to-date value of the appropriate *y*, either positive or negative, this value of *y* being obtained from a *y* store 9 by means of a path 14. The accumulator 4 operates to add to the value of *y* from the store 9 the value of *dy* from the converter 22, and the augmented value of *y* is applied in parallel to two gates 5A and 5B by paths 12A and 12B respectively. These gates are normally closed, but the gate 5A is opened if there is an output on the conductor 23 representing a positive increment *dx*, whereas the gate 5B is opened if there is an output on conductor 24 representing a negative increment *dx*, positive and negative increments *dx* cannot occur simultaneously. The gates 5A and 5B have output paths 13A and 13B which lead respectively to the add and subtract inputs of an accumulator 6 which accumulates the value of *dz*. For a particular elementary increment the *dz* accumulator 6 also receives the appropriate R number from an R number store 7 and in the accumulator that number R is augmented or diminished by the *y* signal transmitted by the gate 5A or 5B, assuming there is a *dx* increment. The *dz* accumulator 6 has a finite capacity and the addition of *y* and R in the *dz* accumulator may or may not cause the accumulator 6 to produce a "1" in the overflow stage and therefore an output representing a unit increment of *dz* in one or other of the output conductors 25A and 25B, an output in the conductor 25A representing a positive *dz* increment and an output in the conductor 25B representing a negative *dz* increment. The accumulator 6 is a conventional binary accumulator capable of adding or subtracting and when the magnitude of the *y* element from the gate 5A or 5B is such that in the accumulator 6 the sign digit changes from 0 to 1 a *dz* output is produced. If on the other hand the *y* element does not cause the sign digit to change from 0 to 1 no output is produced in 25A or 25B, indicating that the *dz* output represents a binary 0 digit. When the sign in the *dz* accumulator 6 changes from 0 to 1, a corresponding output is produced in the conductor 25A if *dx* and *y* are both positive or both negative. On the other hand when the sign digit changes from 0 to 1 the corresponding *dz* output is produced on the conductor 25B if *dx* and *y* have different signs. The circuit for selecting the appropriate conductor is assumed to be incorporated in the *dz* accumulator and has not been shown because many possible constructions will be apparent to those skilled in the art. The R store 7 serves the same function in regard to the *dz* accumulator 6 as the store 9 serves in regard to the accumulator 4, but the store 7 need only store positive numbers as the residue R is always positive with the mode of operation described because of the use of the complements to represent negative numbers. After each elementary integration the residue R in the accumulator 6 and the incremented value of *y* in the accumulator 4 are returned to the respective stores 7 and 9.

The output and the input paths for the *y* store 9 are denoted by the references 14 and 15, and the output and input paths for the R store 7 are denoted by the references 18 and 19. Transfer to and from these two stores are controlled by a common address selector 8 which may be of a known construction, and it is arranged to execute a predetermined cycle addresses timed from the synchronising pulse generator 21. The accumulating components of the integrator operates in the parallel mode and therefore the paths 11, 12A, 12B, 13A, 13B, 14, 15, 18 and 19 each comprise a plurality of conductors of a number determined by the number of binary digits employed. However, it will be understood that the integrator may operate in serial mode in which case each of the paths may only comprise a single conductor although suitable serialising arrangements must be provide.

Though separate "add" and "subtract" inputs are shown in the accumulator 6, this is merely illustrative and subtracting is preferably achieved by applying any *y* quantity received from the gate 5B to the add input by way of a complementer. In this event the selection of the conductors 25A and 25B to receive the *dz* output signal, when the accumulator 6 overflows, can be performed in response to the value of the sign digit of the applied number, since a positive input can only produce positive overflow and a negative input a negative overflow.

When starting an integration, the initial values of *y* and R have of course to be established independently. This is provided by operating manual switches, but as known techniques may be employed for establishing initial values of *y* and R the provision of such values will not be further described.

To facilitate the setting up of a programme, bearing in mind that corresponding connections have to be made in both planes KA and KB, it is convenient to bring corresponding lines in the two planes to adjacent pairs of sockets on the plugboard. A single connector assembly may either be employed to make a pair of corresponding connections in the two planes. Each connector assembly would then comprise two plugs each having two prongs to fit into a pair of sockets. The corresponding prongs in the two plugs would be connected by individual diode-and-resistor combinations. To reduce the possibility of incorrect insertion of the plugs, the two prongs in any one plug may have different shapes, the individual sockets in the socket pairs being correspondingly shaped.

If desired instead of storing the *dz* outputs in bistable circuits these may be applied directly to the matrix and the *dx* and *dy* pulses can be stored on condensers. Thus the voltage on a *dy* condenser will gradually tend to its correct value which will be reached when the appropriate period of integration is reached, and the condensers will be discharged immediately after reading the *dx* and *dy* values.

Furthermore, the programming circuit can be operated with a ternary system in which the digit values are 0, 1 and 2, the digit value 0 being taken to represent a *dz* (that is *dx* or *dy*) increment of −1, the digit value 1 being taken to represent a *dz* increment of zero and the digit value 2 being taken to represent a *dz* increment of +1. The programme circuit need thus comprise only one plane, but the temporary storage circuits would require to be three state circuits. Only positive binary numbers would moreover, need to be dealt with by the converter 22, the accumulators 4 and 6 and the stores 7 and 9. However, in determining the significance of the

*dz* output, regard must be had to the fact that zero is represented by some positive signal on the stores 4 and 6. A binary digital code may also be employed throughout the analyzer. In this case to allow for signal integration, the signal corresponding to a "1" bit may be taken, in known manner, to represent a positive increment, a signal corresponding to a "0" bit is taken to represent a negative increment, whilst to designate zero increment, the notation ". . . 10 10 10 . . . " is employed, that is to say a signal representing "1" and a signal representing "0" are applied alternately.

What I claim is:

1. A digital differential analyser comprising digital integrating means, a first plurality of input signal paths for increments to the respective integrands of the different integrations of an integration cycle, a second plurality of input signal paths for increments in the respective integration variables of the integrations of the cycle, means for coupling said input signal paths to said integrating means, a plurality of output signal paths corresponding respectively to the different integrations, means for deriving output signals from said integrating means representing increments in the integrals produced as a result of an integration, means for applying said output signals to the respective output signal paths, and programming means for selectively connecting said output signal paths to apply signals to said input signal paths, said programming means comprising means for producing analogue signals of one of a plurality of predetermined values in response to said output signals, means for summing said analogue signals in different combinations according to a desired programme to produce a plurality of output analogue signals simultaneously, and means for maintaining said output analogue signals on said first plurality of input signal paths, said coupling means comprising analogue to digital converting means for converting an output analogue signal into digital form for application to said integrating means.

2. An analyser according to claim 1 comprising a signal digital integrator for forming the increments to an integral by the multiplication of the respective integrand by the increment in the respective integration variable, and means for applying signals to said integrating means from the input signal paths of each of said first and second pluralities in sequence.

3. An analyser according to claim 2 comprising resistive connections between selected ones of said output signal paths and selected ones of said input signal paths, and summing means for the currents through said resistive connections.

4. An analyser according to claim 3 wherein said programme means comprises switchable connectors each including a rectifier device.

References Cited in the file of this patent

UNITED STATES PATENTS

| | | |
|---|---|---|
| 2,821,691 | Andre et al. | Jan. 28, 1958 |
| 2,850,232 | Hagen et al. | Sept. 2, 1958 |
| 2,969,533 | Shanahan | Jan. 24, 1961 |
| 3,034,719 | Anfenger | May 15, 1962 |

FOREIGN PATENTS

| | | |
|---|---|---|
| 880,014 | Great Britain | Oct. 18, 1961 |